Ivan Z. Ivanov
Vassil S. Stanev
INVENTORS.

BY

Karl J. Ross
Attorney

United States Patent Office
3,565,506
Patented Feb. 23, 1971

3,565,506
ELECTROOPTIC SYSTEM OF LENGTH MEASUREMENT
Ivan Zvetanov Ivanov and Vassil Stanimirov Stanev, Sofia, Bulgaria, assignors to Vish Injenerno-Stroitelen Institut, Sofia, Bulgaria, a corporation of Bulgaria
Filed July 18, 1968, Ser. No. 745,804
Int. Cl. G02b 17/00
U.S. Cl. 350—55                                                  9 Claims

ABSTRACT OF THE DISCLOSURE

In the performance of geodetic measurements, a beam of light emitted from a point A is intercepted at a point B by a deviator including a receiving mirror, a retransmitting mirror and optical elements forming a light path through a tubular linkage between these mirrors whereby the latter may be oriented in a variety of relative positions; the retransmitted light beam may be directed toward a further deviator or a reflector at a point C or may be directly trained upon a receiver at point A.

---

Our present invention relates to a geodetic system for the measurement of distances by the emission of a light signal from a first to a second location and determination of the time required for the signal to be reflected back to its point of origin.

Such geodetic measurements are frequently carried out with the aid of a modulated light beam by a comparison of the phases of the modulation of the outgoing and reflected beams. In many instances, as when surveying hilly or built-up terrain, the observation point and the remote location do not lie on an unobstructed line of sight so that the outgoing and returning light rays must be deviated around intervening obstacles. The use of simple reflectors, such as mirrors or prisms, for this purpose is not satisfactory because of the substantial loss of light energy occurring at the reflecting surface and also because of the difficulty in so positioning this surface as to direct the beam from its source to the remote location and back again to a receiver adjoining the source.

The general object of our present invention is to provide a light deviator positionable at the point of deflection and capable of transmitting a large part of the incident luminous energy in a selected direction within a predetermined azimuthal range, preferably a full range of 360°.

A related object is to provide means in such deviator for also enabling the selection of different angles of elevation for both the incident and the retransmitted beam.

It is also an object of our invention to provide a device of this character adapted to be used either as a deviator or as a high-power reflector for the retransmission of a light beam toward its point of origin.

The foregoing objects are realized, pursuant to our present invention, by the provision of a device wherein two light concentrators are so interconnected by a tubular linkage as to be relatively displaceable over the desired azimuthal and preferably also a substantial elevational range, the device further including light-guiding means such as lenses and/or prisms for channeling incident light rays, impinging upon one light concentrator, through the tubular linkage to the other light concentrator which converts these light rays into an outgoing beam.

With the distances herein contemplated (generally those associated with the lower, e.g. fourth to sixth, classes of geodetic networks), the term "beam" refers to a bundle of virtually parallel light rays which, for their passage through the tubular linkage of the deviator, must be compressed into a considerably narrower bundle and subsequently re-expanded to substantially the original beam width. This compression and expansion is best carried out, in accordance with a further feature of our invention, by the use of a parabolic primary reflector at each light concentrator and a smaller secondary reflector coaxially confronting this primary reflector and forming with it an exactly or nearly afocal catoptric system, the light rays reflected by the secondary reflector being thus generally parallel to one another and concentrated around the mirror axis along which they pass through an aperture in the parabolic reflector into the tubular linkage. If the catoptric system is not truly afocal but causes a slight convergence of light rays reflected by the secondary mirror, and/or if one or more collective lenses are inserted for this purpose in the tubular light channels, the incident light rays may be focused upon a point midway within the linkage and symmetrically defocused therebeyond to form the retransmitted beam. With this type of optical system the linkage may be formed by a series of relatively narrow tubes.

According to another feature of our invention, this linkage includes a central column rising vertically from a base, a pair of lateral arms rotatable about the column axis at an upper end of a lower portion thereof, and a pair of swivel heads rotatably engaging the free ends of these arms and carrying the two light concentrators whereby each of the latter may be swung in a plane perpendicular to its carrying arm and may be rotated together with that arm about the column axis. In this manner, the two concentrators may be placed in any desired azimuthal position and at any angle of elevation which, when read on suitable indicators, will allow the correct calculation of the length of the light path of which this deviator forms a part. Since the infinite number of relative positions thus provided includes a series of positions in which the two concentrators are closely juxtaposed and parallel to each other, the deviator according to our invention may also serve as a straight-line light reflector, differing from an ordinary planar mirror by the fact that the loss of energy between the incident and the reflected beam is considerably reduced and that the normal divergence of the reflected light rays is eliminated or even changed to convergence.

The invention will be described in greater detail with reference to the accompanying drawing in which.

Figure 1:
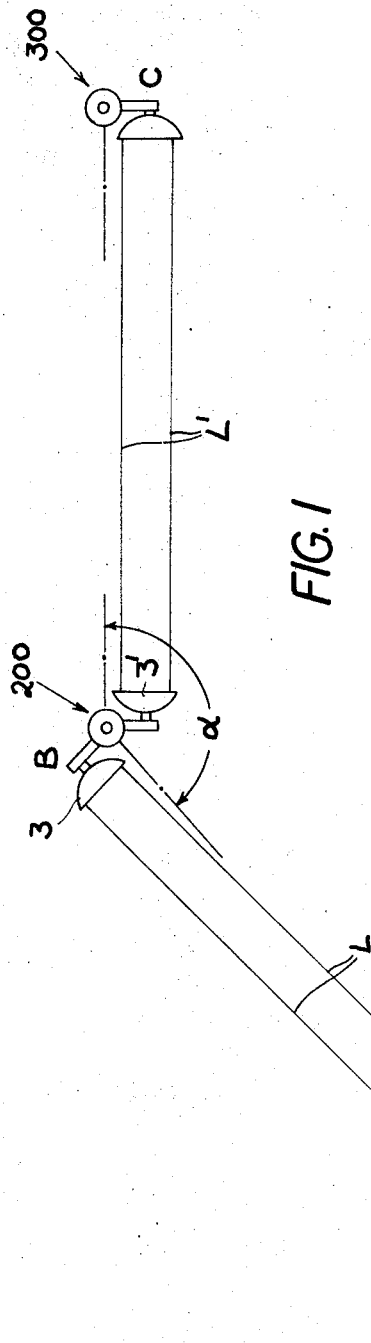
FIG. 1 is a diagrammatic view of a geodetic system utilizing a light deviator according to the invention.

In FIG. 1 we have shown a system for measuring the distance between two points A and C, whose direct line of sight may be interrupted by an obstacle not shown. A source of light 100 at point A emits a luminous beam L toward point B where a deviator 200 receives that radiation and retransmits it in the form of a secondary beam L' toward point C. At the latter point, a reflector 300 redirects the incident light toward point A over the same path, i.e. by way of deviator 200. The reflector 300, which could be a simple mirror, is preferably of a construction identical with that of deviator 200 as described in greater detail hereinafter.

The station 100 at location A includes conventional means for modulating the intensity of the outgoing light beam L and comparing the phase of its high-frequency modulation with that of the return beam received back from location B. The difference in phase is a measure of the transit time along the path A–B–C–B–A and, therefore, of the distance between the three points involved. If the distance A–B is known, e.g. from a previous measurement with the deviator 200 positioned to reflect the beam L directly back to station 100, the distance A–C may be readily calculated from the angle α measured at point B between the axes of two light concentrators 3, 3′ which form part of the deviator 200 and which transmit and receive the beams L and L′, respectively.

Figure 2:
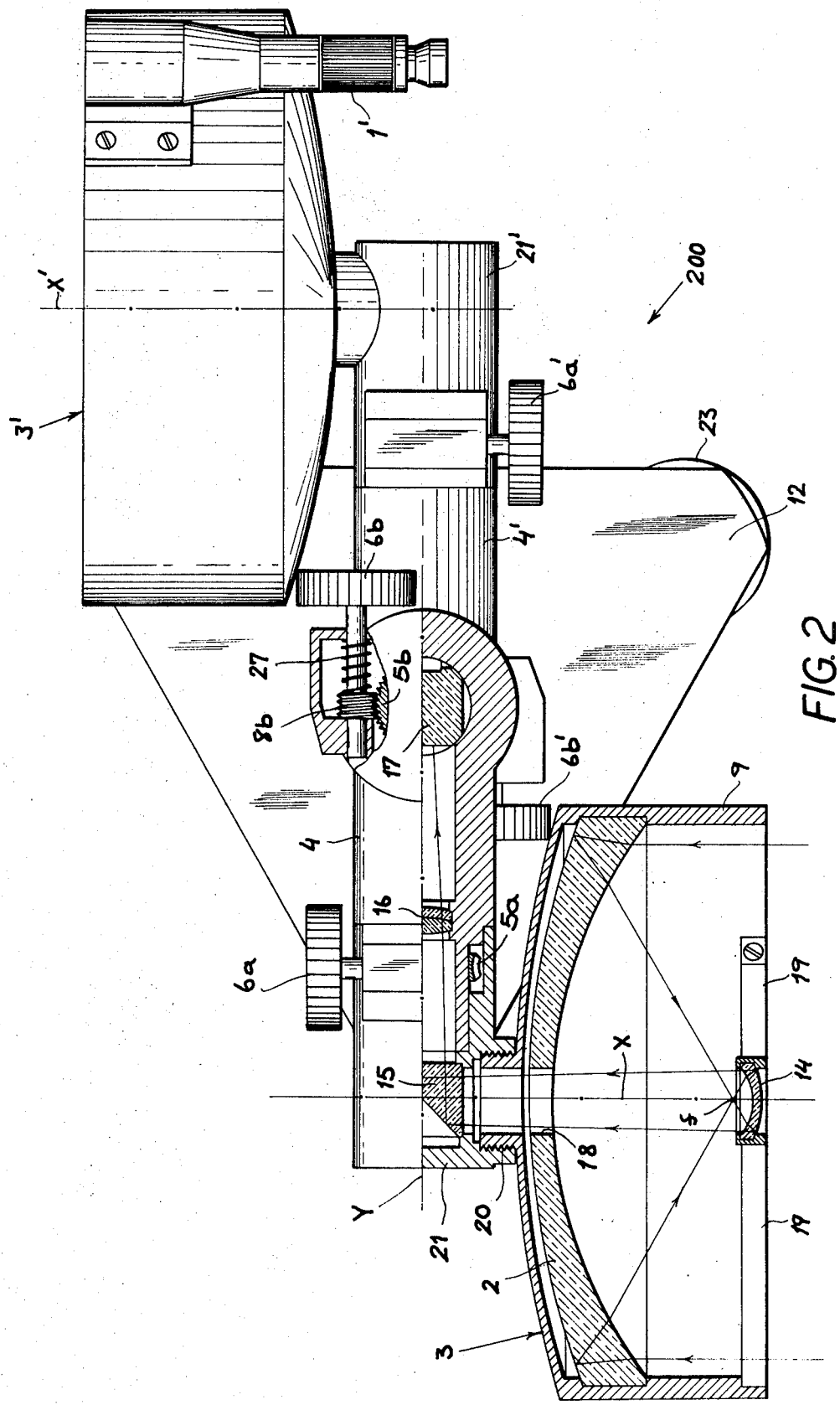
FIG. 2 is a top view, partly in section, of the deviator of FIG. 1 drawn to a larger scale.
Figure 3:
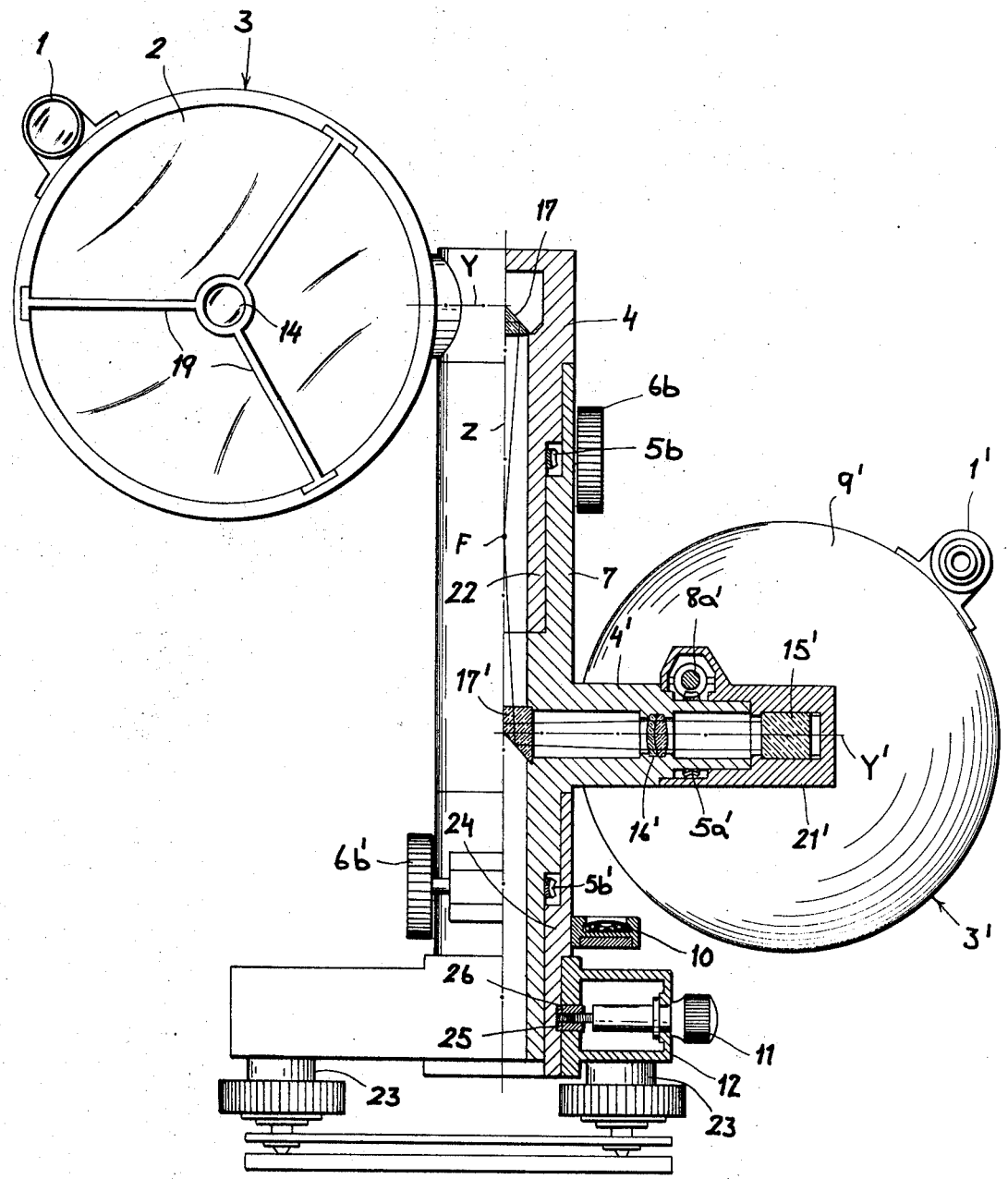
FIG. 3 is a side-elevational view, also partly in section, of the deviator.

FIGS. 2 and 3 show the construction of deviator 200. This deviator comprises two identical light concentrators 3 and 3′ of which only the first one will be described in detail; corresponding elements of concentrator 3′ have been identified by like reference numerals with the addition of prime marks.

Light concentrator 3 comprises a pair of nearly conjugate coaxial reflectors 2 and 14, reflector 2 being a parabolic mirror which focuses incoming parallel light rays upon a point $f$ on the mirror axis $x$. The secondary reflector 14 is a considerably smaller spherically concave mirror whose own focal point does not quite coincide with point $f$ and which therefore generates a slightly convergent bundle of light rays traversing a central aperture 18 of mirror 2. The mirror housing 9, which supports the secondary reflector 14 by means of three radial bars 19, also carries an optical sight L for visually aligning the concentrator 3 with the light source at station 100 (FIG. 1); the corresponding sight L′ of concentrator 3′ serves for alignment with the remote reflector 300 or, possibly, with a reflector of another intermediate deviator interposed between points B and C. Housing 9 has a neck 20 threadedly received in a swivel head 21 which embraces, for rotation about a horizontal axis $y$, the free end of a tubular arm 4 laterally projecting from the top of a tubular vertical column 7, arm 4 having an integral extension 22 rotatably received in that column. A base 12, resting on three adjustable legs 23 to facilitate its horizontal positioning with the aid of a spirit level 10, supports the column 7 whose lower end is rotatably seated in a sleeve 24 rising from the base. Sleeve 24 is locked in position by means of a setscrew 11 threadedly engaging a square nut 25 which, upon rotation of the screw in a tightening sense, enters an annular groove 26 in the outer periphery of the sleeve. A lower portion of column 7, just above sleeve 24, is integral with another lateral arm 4′ which is similar to arm 4 and carries a swivel head 21′ supporting the light concentrator 3′ for rotation about a horizontal axis $y'$. The vertical spacing of the two axes $y$, $y'$ is slightly greater than the diameter of concentrator housing 9 or 9′ whereby the two concentrators may freely rotate past each other and may also be closely juxtaposed with their axes $x$, $x'$ parallel to each other.

In order to facilitate the relative rotation of arms 4, 4′, sleeve 24 and swivel heads 21, 21′, we provide a number of manually operable setting knobs 6a, 6b, 6a′, 6b′. Each of these knobs is rigid with a respective worm, shown at 8a′ and 8b′ for the knobs 6a′ and 6b, normally engaging an associated worm gear 5a, 5b etc. As particularly illustrated for worm 8b and worm gear 5b, each worm is also retractable by an axial outward movement of its knob against the force of a spring 27 so as to become disengaged from its worm gear, thereby enabling direct relative rotation of the two coupled parts into approximately their desired position. The vernier adjustment of that position is then carried out by rotation of the knob upon re-engagement of the worm and its gear.

Figure 4:
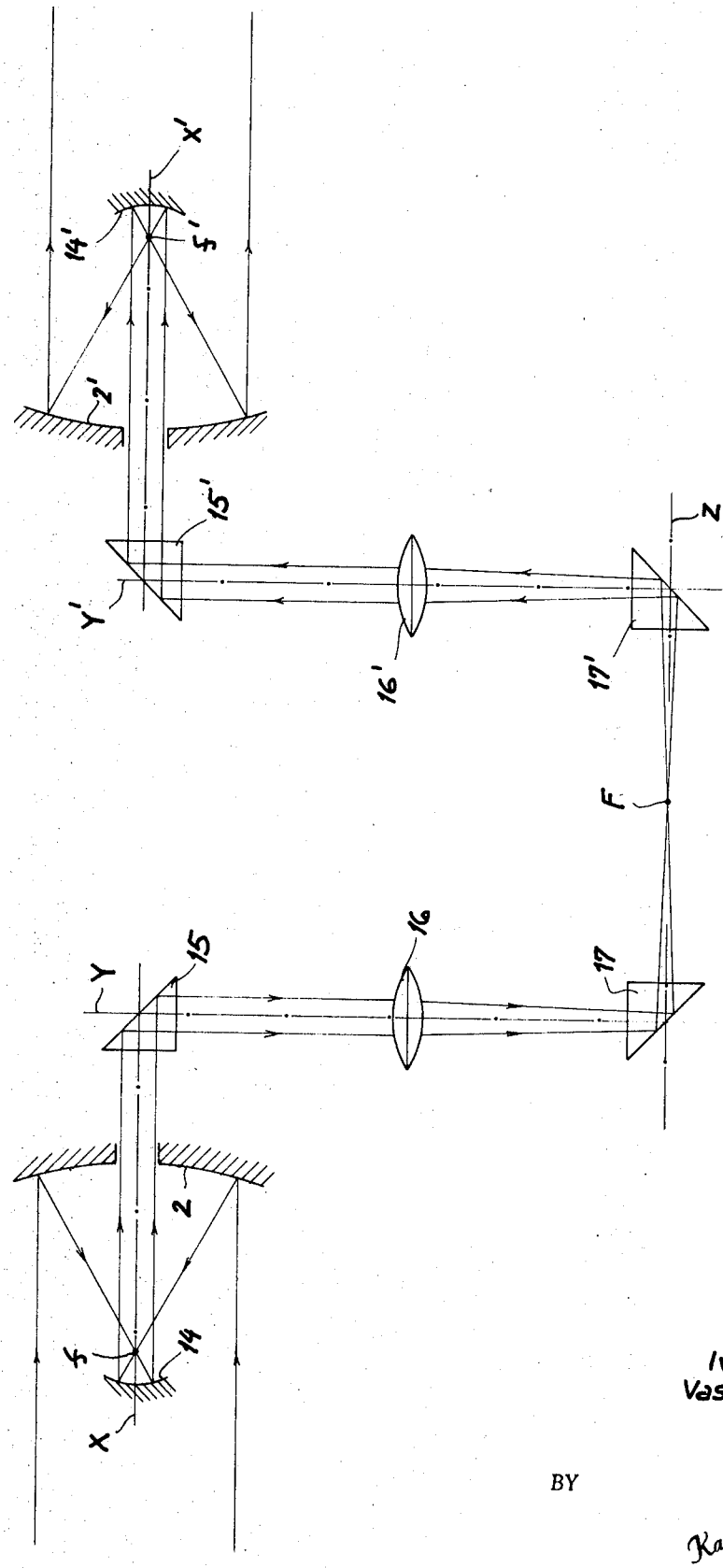
FIG. 4 is a diagram showing the path of the light rays through the deviator of FIGS. 2 and 3.

The light rays passing through swivel head 21 are deflected, by a prism 15 rigid therewith, so as to continue along the axis $y$ of arm 4 which contains a collective lens 16 increasing the convergence of these rays; after passing another deflecting prism 17, disposed in arm 4 at the junction thereof with column 7, these rays are caused to converge at a focal point F midway between prism 17 and another prism 17′ symmetrically located in the column at the axis $y'$ of arm 4′. The rays diverging beyond point F traverse another collective lens 16′, symmetrically positioned along the axis $y'$, and, after emerging from arm 4′, are deflected by a further prism 15′ into the direction of axis $x'$, thus toward the secondary mirror 14′ of concentrator 3′. This path of the light rays, which of course can also be traced in the reverse direction, is best illustrated in FIG. 4.

Axes $x$ and $x'$, which in the position shown in the drawing are horizontal, can be inclined at any desired angle of elevation with the aid of knobs 6a and 6a′, respectively. Knobs 6b and 6b′ serve to vary the azimuthal angle (α in FIG. 1) included between the axes $y$ and $y'$ and, therefore, also between the two vertical planes which bisect the concentrators 3 and 3′, respectively, and contains the axes $x$ and $x'$ thereof. All these angles may be read on suitable instruments, not shown, mounted on the deviator 100.

It will be apparent that, if the curvature of mirror 2 were changed to place the focal point F beyond mirror 14, the latter should be made convex rather than concave toward mirror 2 in order to concentrate the incident light rays into a narrow bundle capable of passing through swivel head 21 and arm 4. Also, if the convergence of the catoptric system 2, 14 is increased, the lens 16 may be omitted entirely or even replaced by a dispersive lens. Instead of focusing the rays at the midpoint F of their path, they may also pass in a parallel bundle through column 7. The arrangement shown, however, has the advantage of functioning satisfactorily even if the incident light beam is not exactly centered on the reflector axis $x$ or $x'$.

Figure 5:
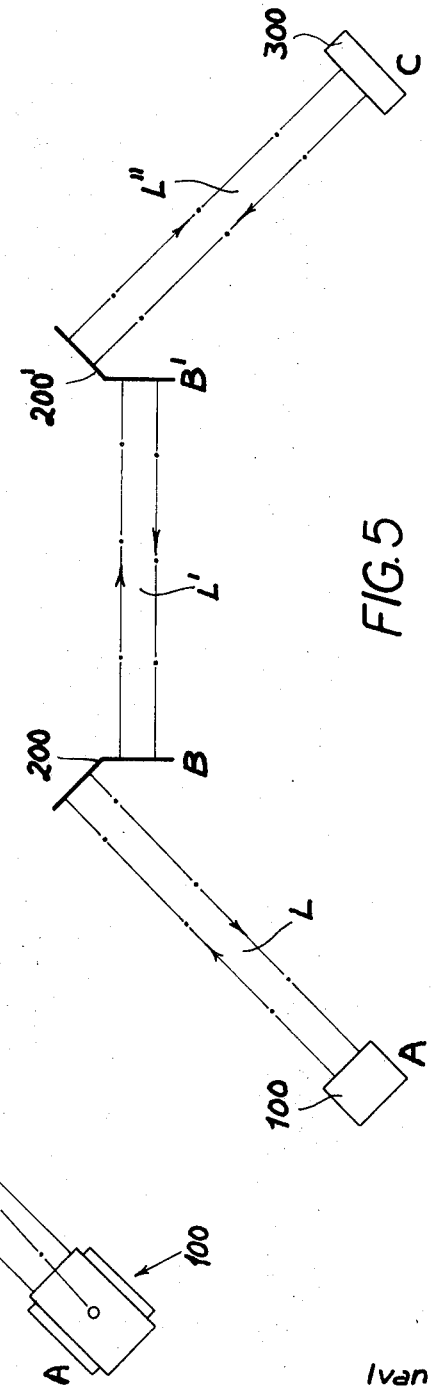
FIG. 5 is another diagrammatic view, illustrating details of a transmitting and receiving station associated with the deviator.

FIG. 5 illustrates, diagrammatically, the possibility of extending our geodetic system to include more than one deflection point. Thus, as shown in that figure, a second deviator 200′ may be interposed at a location B′ between location B, i.e. deviator 200, and location C, i.e. reflector 300. With this arrangement it is possible to measure the length of any section or combination of sections such as AB, ABB′, BB′, BB′C, B′C or ABB′C. Thus, section BB′ may be measured by using deviator 200′ as a reflector and, after determining the distance ABB′ in the aforedescribed manner, deducting the known length AB from it. Similarly, section B′C may be computed as the difference $ABB'C - ABB'$, the total length ABB′C being ascertainable for example by phase comparison at station 100 (point A) in the same manner as the distance ABC in FIG. 1. Any number of additional deviators may, of course, be included to determine the length of any section of a repeatedly bent light path.

The replacement of ordinary mirrors by the deviator herein disclosed has been found to increase the efficiency of such geodimeters by at least 30 to 50%.

What is claimed is:

1. A geodetic system comprising a source of light at a first location; a light deviator at a second location remote from said first location; and reflecting means at a third location; said light deviator comprising a first light concentrator facing said source in optically aligned relationship therewith, a second light concentrator facing said reflecting means in optically aligned relationship therewith, tubular link means interconnecting said light concentrators, and light-guiding means for channeling light rays from a beam incident upon one of said light concentrators through said tubular link means to the other of said light concentrators and converting said light rays into an outgoing beam retransmitted by the last-mentioned light concentrator to said reflecting means and back from said reflecting means to said source, said light concentrators are interconnected by said link means with freedom of relative displacement over a predetermined azimuthal range.

2. A system as defined in claim 1 wherein said link means comprises a central column with a vertical axis, a first transverse arm mounted on an upper portion of said column for rotation about said vertical axis, and a second transverse arm mounted on a lower portion of said column for rotation about said vertical axis independently of said first arm, said first and second light concentrators being respectively carried on the free ends of said first and second arms.

3. A system as defined in claim 2 wherein said light concentrators are provided with swivel heads respectively securing same to said free ends with freedom of rotation in planes perpendicular to said arms.

4. A system as defined in claim 3 wherein each of said light concentrators comprises a relatively large parabolic reflector on the respective swivel head and a relatively small confronting reflector coaxial with said parabolic mirror, said reflectors being shaped and positioned to convert a beam of parallel light rays incident upon said parabolic reflector into a narrower bundle of generally parallel light rays centered on the axis of said reflectors, said parabolical reflector being provided with an axial aperture for the passage of said bundle.

5. A system as defined in claim 4 wherein said light-guiding means includes a first deflector at each swivel head in line with the axis thereof, said first deflector being adapted to direct said bundle of light rays through the adjoining transverse arm into said column, and a second deflector at the junction of said column with each of said arms for directing light rays from either of said arms axially through said column toward the other of said arms.

6. A system as defined in claim 5 wherein said light-guiding means further comprises lens means in each of said arms for focusing said bundle upon a point along the column axis midway between said junctions.

7. A system as defined in claim 3, further comprising first setting means at each of said swivel heads and second setting means at the junctions of said column with each of said arms for respectively rotating said swivel heads about said arms and said arms about said column.

8. A system as defined in claim 7 wherein each of said setting means comprises a manually rotatable worm, a worm gear engaged by said worm, and a knob for rotating said worm and for temporarily disengaging said worm from said worm gear.

9. A system as defined in claim 2, further comprising a base, said column being integral with said second arm and rotatably journaled in said base.

References Cited

UNITED STATES PATENTS

| 1,079,884 | 11/1913 | Schurmann | 350—22 |
| 1,607,688 | 11/1926 | Perrin et al. | 350—22 |
| 2,662,187 | 12/1953 | Kavanagh | 350—55 |
| 2,753,260 | 7/1956 | Braymer | 350—28X |
| 3,040,176 | 6/1962 | Rempka et al. | 350—199 |
| 3,158,676 | 11/1964 | McCaffrey | 350—294 |
| 1,627,097 | 5/1927 | Kauch | 33—71X |

PAUL R. GILLIAM, Primary Examiner